US010288511B2

(12) United States Patent
Weller et al.

(10) Patent No.: US 10,288,511 B2
(45) Date of Patent: May 14, 2019

(54) RELATIVE PRESSURE SENSOR

(71) Applicant: VEGA GRIESHABER KG, Wolfach (DE)

(72) Inventors: Bernhard Weller, Wolfach (DE); Johannes Seiffe, Zell a. H. (DE)

(73) Assignee: VEGA GRIESHABER KG, Wolfach (DE)

( * ) Notice: Subject to any disclaimer, the term of this patent is extended or adjusted under 35 U.S.C. 154(b) by 165 days.

(21) Appl. No.: 15/296,450

(22) Filed: Oct. 18, 2016

(65) Prior Publication Data

US 2017/0153159 A1    Jun. 1, 2017

(30) Foreign Application Priority Data

Nov. 30, 2015  (EP) ..................... 15196952

(51) Int. Cl.
*G06F 11/30* (2006.01)
*G01L 9/12* (2006.01)
*G01L 19/00* (2006.01)
*G01L 9/00* (2006.01)

(52) U.S. Cl.
CPC ............ *G01L 9/125* (2013.01); *G01L 9/0072* (2013.01); *G01L 19/0092* (2013.01)

(58) Field of Classification Search
CPC ...................................................... G01L 9/125
See application file for complete search history.

(56) References Cited

U.S. PATENT DOCUMENTS

2005/0000290 A1* 1/2005 Petit ................. G01L 9/045
                                                              73/708
2010/0139407 A1* 6/2010 Dannhauer ......... G01L 9/065
                                                              73/708

FOREIGN PATENT DOCUMENTS

DE    10 2013 222 129 B3    10/2014
DE    10 2013 114 741 A1    6/2015

OTHER PUBLICATIONS

European search report for related application 15196952.4, dated May 2, 2016.
EPO office action for related European application 15196952.4, dated Aug. 7, 2017.

* cited by examiner

*Primary Examiner* — Phuong Huynh
(74) *Attorney, Agent, or Firm* — William Gray Mitchell

(57) ABSTRACT

The invention is a method for determining an output value, which is equivalent to a pressure or a value proportional to the pressure, comprising a relative pressure sensor with at least one measured capacity formed between a basic body and a measuring membrane and at least one reference capacity formed between the basic body and the measuring membrane, with the determination of the output value comprising at least the following steps: (1) determining the measured capacity, (2) determining the reference capacity, (3) comparing a value of a first function $F_Z$ of the reference capacity to the measured capacity and (4) issuing $A = F_Q(C_M, C_R)$ for $C_M = F_Z(C_R)$ $A = F_{CR}(C_R)$ for $C_M > F_Z(C_R)$ $A = F_{CM}(C_M)$ for $C_M < F_Z(C_R)$ as the output value.

6 Claims, 2 Drawing Sheets

RELATIVE PRESSURE SENSOR

CROSS REFERENCE TO RELATED APPLICATIONS

This patent application claims priority to European Patent Application 15 196 952.4, filed on Nov. 30, 2015.

STATEMENT REGARDING FEDERALLY SPONSORED RESEARCH OR DEVELOPMENT

No federal government funds were used in researching or developing this invention.

NAMES OF PARTIES TO A JOINT RESEARCH AGREEMENT

Not applicable.

SEQUENCE LISTING INCLUDED AND INCORPORATED BY REFERENCE HEREIN

Not applicable.

BACKGROUND

Field of the Invention

The present invention relates to a method for the relative pressure measurement using a capacitive pressure measuring cell, as well as a relative pressure measuring cell.

Background of the Invention

Various relative pressure sensors are known from prior art. A relative pressure sensor serves to measure the pressure difference between the pressure in a medium to be measured and the presently given atmospheric pressure. Such a relative pressure sensor is made from a basic body, which together with a measuring membrane connected thereto at the edge forms a sensor chamber and/or pressure chamber. For the purpose of measuring the relative pressure the reference air is guided via a ventilation opening at the side of the basic body into the sensor chamber, with here the surface of the measuring membrane facing away from the sensor chamber being impinged with the pressure to be measured. The deformation of the measuring membrane caused thereby represents a measure for the relative pressure which is converted into a measuring signal.

Ceramic capacitive pressure measuring cells, comprising a basic body sintered body and a membrane sintered body, are soldered or hard soldered to each other at their edges using a spacer such that a sensor chamber develops. The solder or active hard solder used, e.g., glass frit, serves here as the spacer itself.

Before assembling the basic body and the membrane body, here basic body electrodes and a membrane electrode are applied on their surfaces, which form the chamber walls of the sensor chamber, usually by way of sputtering tantalum or a thick-layer gold serigraphy.

When reference air is fed via the ventilation opening, moisture enters the sensor chamber, which condenses here when the dew point is fallen short, and this way it can compromise the function. As a result of an accumulation of water, the dielectric constant of the effective electrode surfaces is compromised, causing the measurement to become falsified.

In order to improve the tolerance to humidity it is suggested according to EP 1 061 351 A1 to completely coat the interior surfaces of the sensor chamber of such a pressure measuring cell with a hydrophobic material, with silane preferably being used. Due to the fact that such coatings comprising silanes or silane compounds are organic in nature, their useful temperature range is limited. Another disadvantage is given here in that such coatings, due to their temperature limitations, can only be generated after the bonding of the membrane and the basic body using a vacuum generated in the basic body using the ventilation opening, i.e. here high technical production expenses are required.

Further, a pressure measuring cell is known from EP 2 463 635 A1 in which a simplified production is yielded such that before the bonding of the membrane and the basic body a hydrophobic glass coating is applied over the entire surfaces of the basic body and the membrane previously provided with electrodes.

Due to the fact that with the above-described design approaches it is not possible to completely prevent any condensation inside the measuring chamber, still faulty measurements occur caused by condensation. This leads to the objective of the present invention. This objective is attained in a method for determining an output value as described herein as well as a relative pressure sensor according to the teaching hereof.

BRIEF SUMMARY OF THE INVENTION

In a preferred embodiment, a method for determining an output value (A), which is equivalent to a pressure (P) or a value proportional to the pressure (P), using a relative pressure sensor with at least one measured capacity (CM) provided between the basic body (3) and a measuring membrane (5) and at least one reference capacity (CR) provided between the basic body (3) and the measuring membrane (5), with the determination of the output value (A) comprising at least the following steps determining the measured capacity (CM)
determining the reference capacity (CR)
comparing a value of a first function FZ (CR) of the reference capacity (CR) to the measured capacity (CM), and
issuing $$A=FQ(CM,CR) \text{ for } CM=FZ(CR)$$

$$A=FCR(CR) \text{ for } CM>FZ(CR)$$

$$A=FCM(CM) \text{ for } CM<FZ(CR)$$

as the output value.

In another preferred embodiment, the method as described herein, in which the output value (A) is additionally compensated for temperature and/or humidity.

In another preferred embodiment, the method as described herein, in which the first function considers a deviation (Z) depending on the precision of the device, particularly amounting to +/−1%.

In another preferred embodiment, a relative pressure sensor (1) with at least one measured capacity (CM) provided between a basic body (3) and a measuring membrane (5) and at least one reference capacity (CR) provided between the basic body (3) and the measuring membrane (5), with the pressure sensor (1) comprising a sensor electronic (21) with a memory (23) and a comparing unit (25), with in the memory (23) at least
one first function FZ (CR) of the measured capacity (CM) being saved depending on the reference capacity (CR), a second function FQ (CM, CR) for determining an output value (A) depending on the measured capacity (CM) and the reference capacity (CR), a third function FCR (CR) for determining the output value depending on the reference capacity (CR), as well as a fourth function FCM (CM) for determining the output value depending on the measured capacity (CM) being saved, the measured capacity (CM) and a value of the first function (FZ) being fed to the comparing unit (25), and depending on said comparison the following being issued:

$A=FQ(CM,CR)$ for $CM=FZ(CR)$ $A=FCR(CR)$ for $CM>FZ(CR)$ $A=FCM(CM)$ for $CM<FZ(CR)$.

In another preferred embodiment, the relative pressure sensor as described herein, which comprises a second reference capacity (CR), with in the memory at least a fifth function being saved to determine the output value (A) depending on the second reference capacity (CR).

In another preferred embodiment, the relative pressure sensor as described herein, which further comprises a temperature sensor (18) and/or a humidity sensor (19) at or in the pressure sensor, preferably in a measuring chamber (6) formed between the basic body (1) and the measuring membrane (5).

DETAILED DESCRIPTION OF THE INVENTION

Figure 1:
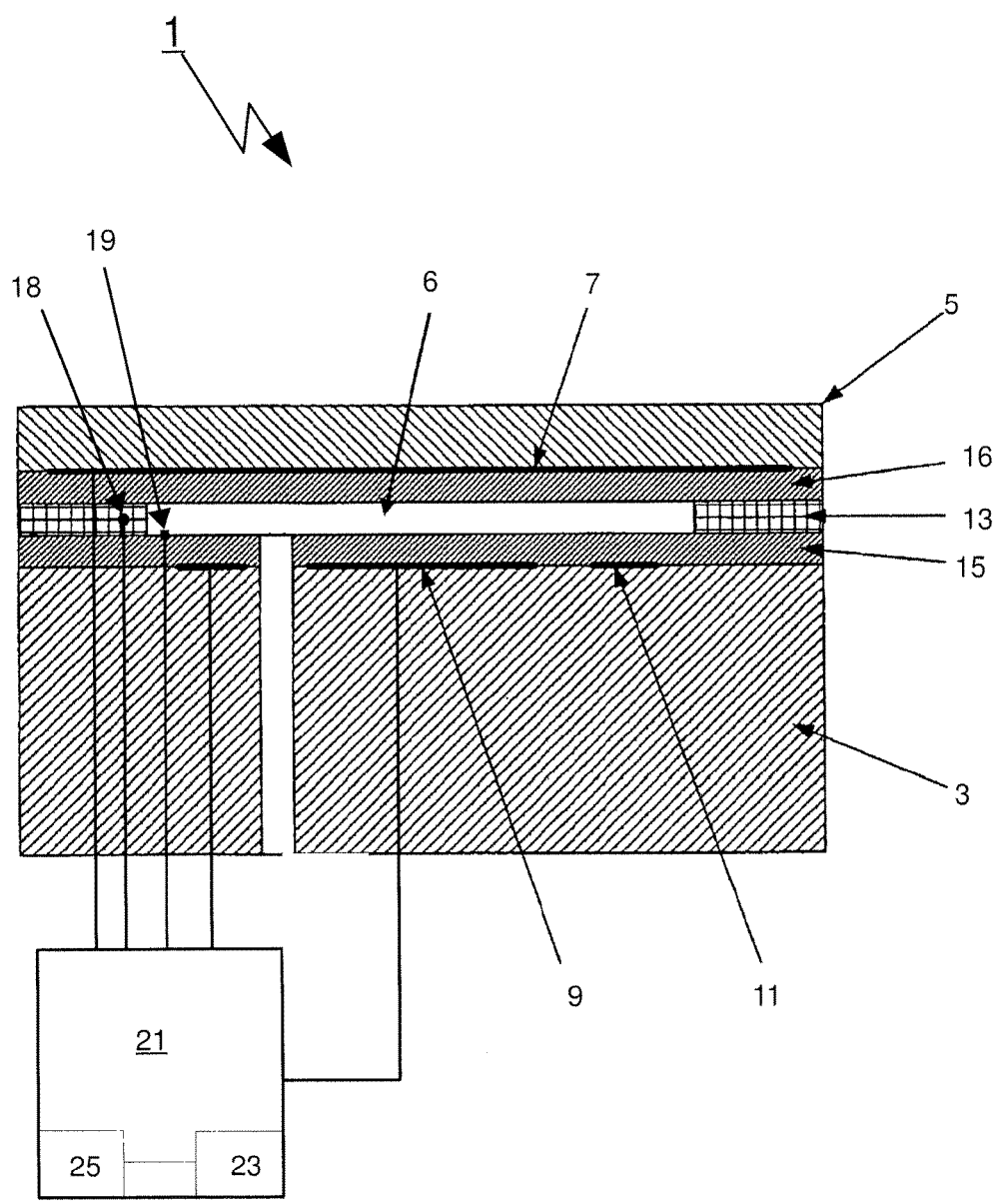
FIG. 1 is a line drawing evidencing a sketch of the principle of a pressure sensor 1 according to the present invention.

The method according to the invention for determining an output value that is equivalent to a pressure or a value proportional to said pressure using a relative pressure sensor with at least one measured capacity formed between a basic body and a measuring membrane comprises at least the following steps:

Determining the value of a measured capacity, determining the value of a reference capacity, comparing a value with a predetermined first function of the reference capacity with the value of the measured capacity, and issuing as the display value the value of a second function depending on the measured capacity and the reference capacity, if the value of the measured capacity is equivalent to the value of the first function depending on the reference capacity, the value of a third function depending on the reference capacity if the value of the measured capacity is greater than the value of the first function, and issuing the value of a fourth function depending on the measured capacity if the value of the measured capacity is lower than the value of the first function.

The invention is here based on the acknowledgment that in spite of a hydrophobic design of the surfaces of the measuring membrane and the basic body facing each other, for example, any condensation of moisture inside the sensor cannot be completely prevented, however such condensation generally affects initially only one of the capacitors embodied inside the pressure measuring cell. With another acknowledgment, that in a normal condition without any condensation a value of the measured capacity can be shown as a function of the reference capacity which results from pressure-induced changes that always affect all capacity values that are subject to change under pressure, it can be determined which of the capacities are affected by a condensation-related change in permittivity and an output value can be issued based on the capacity not affected and/or falsified. Although here a loss of precision is accepted when determining the output value, it still represents an improvement in reference to the output value falsified by condensation.

In a further development of the method according to the invention the output value can additionally be compensated for temperature and/or humidity. By determining the temperature and/or humidity inside the sensor here temperature-induced changes in capacity as well as changes of the capacity based on permittivity altered due to elevated humidity can be determined and considered when calculating the output value.

Additionally or alternatively the first function may consider deviations of for example +/−1% so that any transfer to a calculation of the output value depending on only the reference capacity or only the measured capacity occurs only if actually a considerable influencing has been determined of one of the capacities based on the formation of drops.

A relative pressure sensor according to the present application comprises at least one measured capacity formed between the basic body and a measuring membrane and at least one reference capacity formed between the basic body and the measuring membrane, with the pressure sensor comprising a sensor electronic with a memory and a comparing unit, with the memory saving at least one first function of the measured capacity depending on the reference capacity, a second function for determining an output value depending on the measured capacity and the reference capacity, a third function for determining an output value depending on the reference capacity, as well as a fourth function for determining the output value depending on the measured capacity, and the measured capacity and a value of the first function being fed to the comparing unit, and depending on the comparison the value is issued as the output value of the second function in case the value of the measured capacity is equivalent to the value of the first function, the value of the third function in case the value of the measured capacity is greater than the value of the first function, and the value of the fourth function in case the value of the measured capacity is lower than the value of the first function.

By an appropriate embodiment of the sensor it is achieved that in the normal case, i.e. when no influence is caused by condensation of moisture inside the sensor, the value of a function is issued as the output value depending on the measured capacity and the reference capacity. In this case, by an appropriate calculation of the output value, here disturbing influences affecting both capacities, i.e. both the measured capacity as well as the reference capacity, can be compensated. In case that one of the two capacities is compromised by condensation, this can be determined by comparing the value of the measured capacity to the value of the first function and then a calculation can occur of the output value, using the capacity not affected.

A temperature and/or humidity sensor can be provided in order to compensate temperature and/or humidity induced deviations, i.e. induced by the humidity of the air, at or in the pressure sensor, preferably in a measuring chamber formed between the basic body and the measuring membrane. With such an embodiment it is achieved that the values of the temperature and/or humidity inside the measuring cell are detected and can be considered when calculating the output value.

Due to the fact that the sensor comprises other measuring and/or reference capacities used for the evaluation, additional functions can be included in the memory for determining measurements and compensating measurements as well as for the mutual monitoring of the capacities for deviations caused by condensation.

If the measuring cell comprises one measured capacity, for example, and two reference capacities, advantageously seven functions can be saved in the memory. The following functions are:
  function for calculating the output value depending on the measured capacity, the first reference capacity, and the second reference capacity,
  function for calculating the output value depending on the measured and the first reference capacity,
  function for calculating the output value depending on the measured and the second reference capacity,
  function for calculating the output value depending on the first reference capacity and the second reference capacity,
  function for calculating the output value depending on the measured capacity,
  function for calculating the output value depending on the first reference capacity,
  function for calculating the output value depending on the second reference capacity,
with here it being dependent on which capacities being affected by condensation when selecting the suitable function to determine the output value. The decision that one or more capacities are affected by condensation can be rendered based on functions for control saved in the memory.

This way a further improvement of the measurement can be yielded.

Detailed Description of the Figures

FIG. 1 shows pressure sensor 1 in a longitudinal cross-section, with the pressure sensor 1 essentially comprising a basic body 3 as well as a measuring membrane 5 arranged via a spacer 13 at the basic body 3.

Electrodes are provided at the surfaces of the basic body 3 and the measuring membrane 5 facing each other in order to form a measured capacity $C_M$ as well as a reference capacity $C_R$. In the exemplary embodiment shown in FIG. 1, for this purpose a membrane electrode 7 is provided at the measuring membrane 5, which essentially covers the entire surface of the measuring membrane 5 facing the basic body 3, as well as a measuring electrode 9 centrally arranged at the basic body 3 and embodied in a circular fashion, as well as a reference electrode 11 surrounding the measuring electrode 9 in an annular fashion. The surface of the basic body 3 provided with the measuring electrode 9 and the reference electrode 11 is provided in the present exemplary embodiment with a first hydrophobic coating 15 and the surface of the measuring membrane 5 provided with the membrane electrode 7 with a second hydrophobic coating 16. As shown in the present exemplary embodiment the hydrophobic coatings 15, 16 are each provided over the entire surface of the basic body 3 and the measuring membrane 5 equipped with the electrodes 7, 9, 11, which is particularly advantageous for the production of the present measuring cell 1.

Both the membrane electrode 7 as well as the measuring electrode 9 and the reference electrode 11 are connected to a sensor electronic 21 by lines passing through the basic body 3. In the present exemplary embodiment the signal of a temperature sensor 18, which in the present exemplary embodiment is arranged in the spacer 13, as well as the measuring signal of a humidity sensor 19, which in the present exemplary embodiment is arranged in a measuring chamber 6 arranged between the measuring membrane 5 and the basic body 3 are additionally allocated to the sensor electronic 21. In the sensor electronic 21 both a memory 23 as well as a comparing unit 25 are arranged, within the memory 23 at least one first function $F_Z$ being saved for calculating the measured capacity $C_M$ depending on the reference capacity $C_R$. Further, a second function $F_Q$ is saved in the memory 23 for calculating the output value A based on the measured capacity $C_M$ and the reference capacity $C_R$, a third function $F_{CR}$ for calculating the output value A based on the reference capacity $C_R$, and a fourth function $F_{CM}$ for calculating the output value A based on the measured capacity $C_M$. All functions can be saved both in the closed form as well as in the form of value tables stored in the memory 23.

The comparing unit 25 is supplied with both the value of the measured capacity $C_M$ as well as the value of the measured capacity calculated via the first function $F_Z$. Depending on a comparison of these two values, in the present exemplary embodiment different capacities $C_M$, $C_R$ are used to calculate the output value A.

It has shown that in many cases, due to condensation of humidity in the measuring chamber 6, initially only one of the capacities $C_M$, $C_R$ is affected and that this condition frequently remains over an extended period of time even in case of higher humidity impacting. This is caused by the drop-shaped condensation resulting from the hydrophobic surfaces of the coatings 15, 16 and the locally developing condensation due to temperature distribution over the measuring cell 1. As soon as the first drops condense inside one of at least two pressure-dependent capacities $C_M$, $C_R$ in the measuring chamber 6, this capacity increases sharply due to the high permittivity of the liquid water. Due to the fact that in case of a pressure-related change in capacity always all pressure-sensitive capacity values change and here follow a ratio predetermined by the geometry, any change in capacity caused by condensation can be detected as such and an algorithm can be activated in the sensor electronic for adjusting the calculation of the measurement. In this case these calculations of the output value A and/or the pressure value can be converted to a characteristic which is based only on the capacity or capacities not influenced by condensation. Depending on the arrangement and number of the capacities used in the pressure measuring cell 1 this leads to a worsening of the precision of measurement in reference to all capacities at a dry condition, however compared to the measurement using capacities influenced by condensation the increase in the precision of measurement is still very high. By the described procedure sufficient functionality of the pressure sensor 1 can be maintained for many applications until altering environmental conditions dry up the sensor 1 again and thus the use of all capacities is now possible for calculating the output value A.

Figure 2:
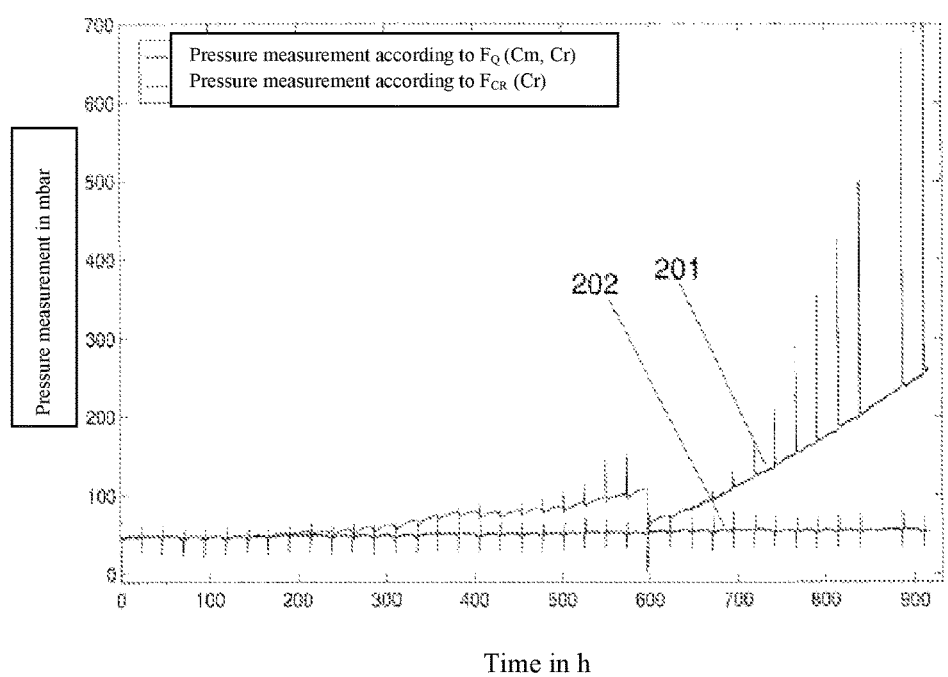
FIG. 2 is a graph evidencing a comparison of the second function and the third function with lastingly affecting humidity.

FIG. 2 shows the temporal progression of two characteristics, with the presently tested ceramic capacitive relative pressure sensor being impinged at the processing side, i.e. from the sides of the measuring membrane 5, over 900 h with the following cycle:

23 h water at 8° C.
1 h water at 20° C.
Pressure: 50 mbar with small peaks when changing the water.

The ambient atmosphere impinging the pressure sensor 1 outside the process environment was as follows:

Temperature: 25° C.
Relative humidity: 98%

Under these conditions the output value A was determined over 900 h, with the first characteristic 201 showing the calculation of the output value A using the measured capacity $C_M$ and the reference capacity $C_R$, and the second characteristic 202 showing a calculation of the output value only based on the reference capacity $C_R$. In FIG. 2 it is clearly discernible that after approx. 160 h the condensation developing in the measuring chamber 6 shows a trend towards higher measurements at the first characteristic 201, while towards the second characteristic 202, which is exclusively based on the reference capacity $C_R$, no changes are seen. As discernible from FIG. 2, the output values according to the first characteristic 201 increase starting approximately at 600 h under the above-mentioned conditions to such an extent that at a pressure of 50 mbar applied here partial values are displayed of up to 250 mbar and when changing the water even exceeding 600 mbar.

LIST OF REFERENCE NUMBERS 1 pressure sensor
3 basic body
5 measuring membrane
6 measuring chamber
7 membrane electrode
9 measuring electrode
11 reference electrode
13 spacer
15 first hydrophobic coating
16 second hydrophobic coating
18 temperature sensor
19 humidity sensor
21 sensor electronics
23 memory
25 comparing unit
A output value
D pressure
Z deviation
$C_M$ measured capacity
$C_R$ reference capacity
$C_{R2}$ second reference capacity
$F_Z$ first function
$F_Q$ second function
$F_{CR}$ third function
$F_{CM}$ fourth function The references recited herein are incorporated herein in their entirety, particularly as they relate to teaching the level of ordinary skill in this art and for any disclosure necessary for the commoner understanding of the subject matter of the claimed invention. It will be clear to a person of ordinary skill in the art that the above embodiments may be altered or that insubstantial changes may be made without departing from the scope of the invention. Accordingly, the scope of the invention is determined by the scope of the following claims and their equitable equivalents.

We claim:

1. A method for determining a pressure or a value proportional to the pressure, using a relative pressure sensor with at least one measured capacity ($C_M$) provided between the basic body and a measuring membrane and at least one reference capacity ($C_R$) provided between the basic body and the measuring membrane, with the pressure sensor comprising a membrane electrode, measuring electrode and reference electrode, wherein the temperature sensor, humidity sensor, membrane electrode and measuring electrode are each wired to a sensor electronic with a memory and a comparing unit, with the determination of the output value (A) comprising at least the following steps determining the measured capacity ($C_M$)
determining the reference capacity ($C_R$)
comparing a value of a first function $F_z$ ($C_R$) of the reference capacity ($C_R$) to the measured capacity ($C_M$), and
issuing $$A=F_Q(C_M,C_R) \text{ for } C_M=F_Z(C_R)$$

$$A=F_{CR}(C_R) \text{ for } C_M>F_Z(C_R)$$

$$A=F_{CM}(C_M) \text{ for } C_M<F_Z(C_R)$$

as the output value.

2. A method according to claim 1, in which the pressure or a value proportional to the pressure is additionally compensated for temperature and humidity.

3. A method according to claim 1, in which the first function considers a deviation depending on the precision of the device, particularly amounting to +/−1%.

4. A relative pressure sensor with at least one measured capacity ($C_M$) provided between a basic body and a measuring membrane and at least one reference capacity ($C_R$) provided between the basic body and the measuring membrane, with the pressure sensor comprising a membrane electrode, measuring electrode and reference electrode, wherein the temperature sensor, humidity sensor, membrane electrode and measuring electrode are each wired to a sensor electronic with a memory and a comparing unit, with-in the memory one first function $F_z$ ($C_R$) of the measured capacity ($C_M$) being saved depending on the reference capacity ($C_R$),
a second function $F_Q$ ($C_M$, $C_R$) for determining an output value (A) depending on the measured capacity ($C_M$) and the reference capacity ($C_R$),
a third function $F_{CR}$ ($C_R$) for determining the output value depending on the reference capacity ($C_R$), as well as
a fourth function $F_{CM}$ ($C_M$) for determining the output value depending on the measured capacity ($C_M$) being saved, the measured capacity ($C_M$) and a value of the first function ($F_z$) being fed to the comparing unit, and depending on said comparison the following being issued:

$$A=F_Q(C_M,C_R) \text{ for } C_M=F_Z(C_R)$$

$$A=F_{CR}(C_R) \text{ for } C_M>F_Z(C_R)$$

$$A=F_{CM}(C_M) \text{ for } C_M<F_Z(C_R).$$

5. A relative pressure sensor according to claim 4, which comprises a second reference capacity ($C_R$), with in the memory at least a fifth function being saved to determine the output value (A) depending on the second reference capacity ($C_R$).

6. A relative pressure sensor according to claim 4, which further comprises a temperature sensor and a humidity sensor at or in the pressure sensor, in a measuring chamber formed between the basic body and the measuring membrane.

\* \* \* \* \*